US006984086B1

(12) United States Patent
Rothman et al.

(10) Patent No.: US 6,984,086 B1
(45) Date of Patent: Jan. 10, 2006

(54) EXTERNAL KEYBOARD FOR USE WITH A PORTABLE INFORMATION TERMINAL

(75) Inventors: Daniel P. Rothman, Fountain Valley, CA (US); Tark Abed, Palo Alto, CA (US)

(73) Assignee: Atek Inc., Santa Ana, CA (US)

( * ) Notice: Subject to any disclaimer, the term of this patent is extended or adjusted under 35 U.S.C. 154(b) by 156 days.

(21) Appl. No.: 10/713,757

(22) Filed: Nov. 14, 2003

(51) Int. Cl.
*B41J 11/62* (2006.01)

(52) U.S. Cl. .................. 400/713; 400/472; 235/1 D

(58) Field of Classification Search ............... 400/713, 400/490, 472, 496; 150/165; 206/320; 235/61 R, 235/1 D
See application file for complete search history.

(56) References Cited

U.S. PATENT DOCUMENTS

| | | | | |
|---|---|---|---|---|
| 5,193,925 A | * | 3/1993 | Foulke | 400/715 |
| 5,197,178 A | * | 3/1993 | Lichte et al. | 29/428 |
| 5,383,643 A | * | 1/1995 | Koch | 248/447 |
| 5,530,234 A | * | 6/1996 | Loh et al. | 235/61 R |
| 5,551,497 A | * | 9/1996 | Stanley | 150/154 |
| 5,975,780 A | | 11/1999 | Fukami | 400/691 |
| 6,285,299 B1 | * | 9/2001 | King-DeBaun | 341/23 |
| 6,489,949 B1 | | 12/2002 | Yin | 345/168 |
| 6,515,852 B2 | | 2/2003 | Huang et al. | 361/680 |
| 6,558,057 B2 | | 5/2003 | Lin | 400/691 |
| 6,626,403 B1 | * | 9/2003 | Wolf et al. | 248/118.1 |
| 6,648,534 B2 | * | 11/2003 | Chen | 400/715 |
| 2003/0000857 A1 | | 1/2003 | Jones | 206/320 |

FOREIGN PATENT DOCUMENTS

JP    2000330701 A    11/2000

\* cited by examiner

*Primary Examiner*—Ren Yan
*Assistant Examiner*—Dave A. Ghatt
(74) *Attorney, Agent, or Firm*—James G. O'Neill; Klein, O'Neill & Singh, LLP

(57) ABSTRACT

A portable keyboard includes a selected number of standard-size keys in a reduced size housing having a removable cover that both protects the keyboard during transit and can be removed and used to support the portable keyboard in selected positions to aid in its use. The reduced size housing and standard-size keys are configured, sized, dimensioned to be operated with a minimum number of errors and to be stored in a portable computer carrying case when not in use.

12 Claims, 4 Drawing Sheets

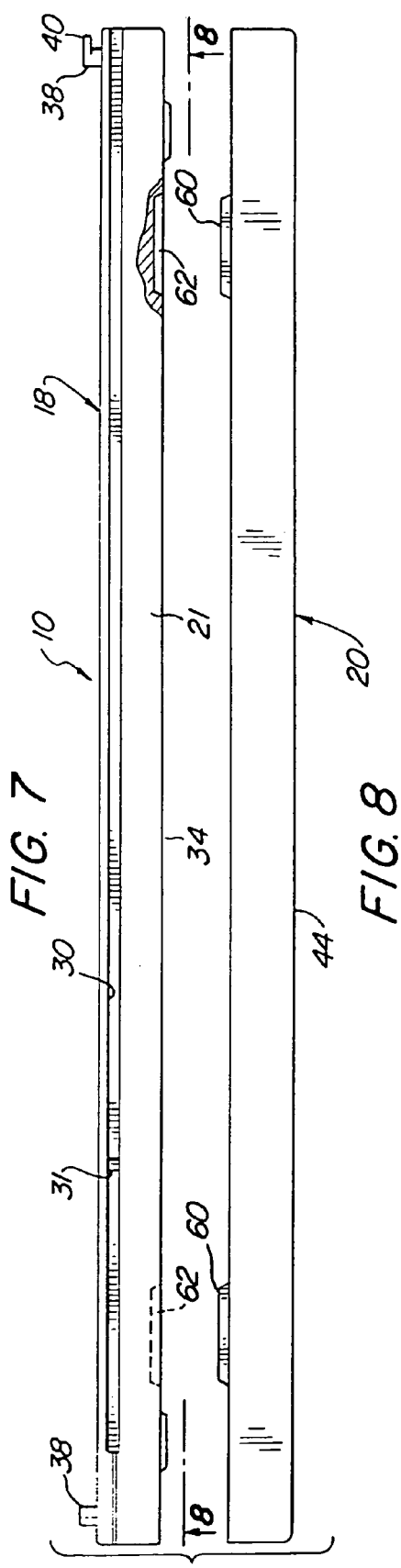
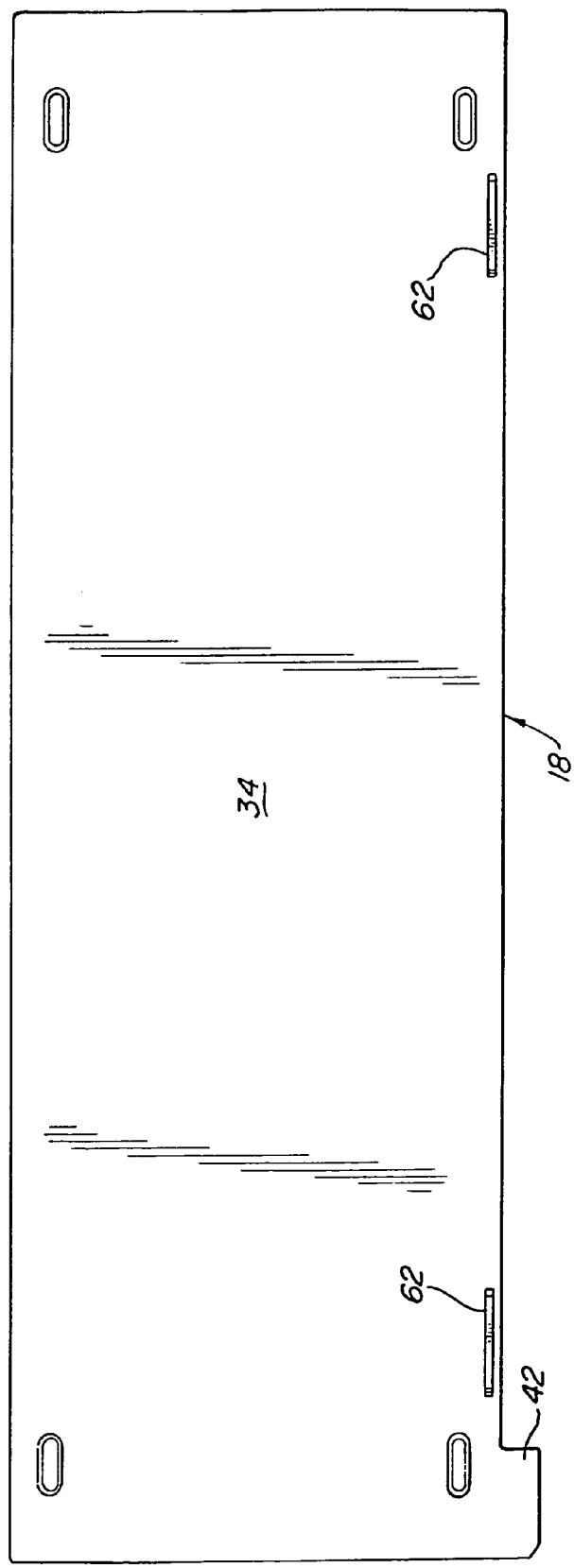

EXTERNAL KEYBOARD FOR USE WITH A PORTABLE INFORMATION TERMINAL

BACKGROUND OF THE INVENTION

1. Field of the Invention

This invention relates generally to keyboards, and more particularly, to a portable keyboard, having mostly normal or standard desktop keyboard size keys in a reduced size enclosure with a removable cover, for use with a portable information terminal, such as a laptop or notebook computer, or the like.

2. Description of Related Art

As the use of smaller, portable information terminals, such as laptop or notebook computers has increased over the years, work efficiency and productivity problems have arisen, particularly in trying to type or enter data using the existing keyboards that are built-into such devices. These problems include typing with an elevated error rate and/or typing at a slower speed in order to avoid high error rates, thus producing a decrease in productivity.

Although a number of persons have different views of why users have such problems with laptop or notebook computer keyboards, through extensive analysis applicants have determined the following: i) the degree of the problem cannot be substantially accounted for by a slightly smaller pitch (distance) between adjacent keycaps within a horizontal row or between adjacent horizontal rows in standard (non-"sub-notebook") laptop or notebook computer keyboards; ii) the degree of the problem cannot be substantially accounted for by slightly smaller surface areas on the tops of keycaps on standard (non-"sub-notebook") laptop or notebook computer keyboards; and iii) the degree of the problem cannot be substantially accounted for by a shorter travel distance of keys on standard (non-"sub-notebook") laptop or notebook computer keyboards. What applicants have found is that the degree of the problem on standard (non-"sub-notebook") laptop or notebook computer keyboards can only be substantially accounted for by the short height of the keys or keycaps on laptop or notebook computer keyboards.

Most manufacturers build standard size desktop keyboards having standard size keys and keycaps with standard heights, spacing (pitch), surface area, tapered (flared) shape and travel (see www.pcguide.com for definitions and explanations) in order to meet the heights, spacing, surface area, shape and travel to which users in a particular country or geographic region have been long accustomed and/or to meet ergonomic regulations. On all of these standard desktop keyboards, when a keycap is hit by a user the keycap will travel only part way down an adjacent keycap. Since the standard keycap is substantially pyramid-shaped, with the narrowest part at the top and the widest part at the bottom, it is very unlikely that a user will hit and fully press down an adjacent key even if his/her finger is off center on the target key. However, because of the lack of space available on laptop or notebook computers, manufacturers do not adhere to the accepted or familiar desktop keyboard standards when making laptop or notebook computer keyboards. Although the pitch, travel and keycap surface area on "sub-notebook" (miniature) laptop or notebook computers may substantially vary from the pitch, travel and keycap surface area on standard desktop computer keyboards and thereby adversely affect typing accuracy and speed, for the much more widely used standard size laptop or notebook computer, these pitch, travel and keycap surface area measurements are not greatly different in percentage terms from those on a standard desktop keyboard. On a standard size laptop or notebook computer keyboard the physical parameter exhibiting by far the biggest difference in percentage terms from a standard desktop keyboard is the height of the keycaps, with the keycaps on the laptop or notebook computer keyboard being substantially shorter. Because of these shorter keycaps on laptop or notebook computers, when a user pushes a keycap the user's finger moves downwardly and in fact travels past the bottom or widest point (flare at bottom of tapered keycap) of an adjacent keycap, and, therefore, the chances of hitting and pressing down the adjacent keycap are dramatically increased if the user's finger is not perfectly centered on the keycap it is hitting, thereby causing problems. Therefore, the applicants have determined that the crux of the problem seems to be in how far a user's finger travels (goes down) when operating a key on a laptop or notebook keyboard "in relation to" the adjacent key. That is, the main problem actually appears to be the relative movement of the user's finger. While a secondary problem with laptop or notebook keyboards is the lack of a separate numeric keypad.

Some users of laptop or notebook computers plug a normal or standard desktop keyboard into the available port in the laptop or notebook computer when not traveling or when at a fixed location for an extended period of time. However, this does not work when a user is mobile, for example, during travel, and it is neither convenient nor feasible to carry a full size external keyboard while traveling.

Although there are a number of patents that disclose keyboards with removable covers, no known patents disclose a portable keyboard for use with known portable information terminals to overcome the above-set forth problems, particularly when traveling. Examples of such known keyboards are shown in U.S. Pat. No. 5,975,780 to Fukami, U.S. Pat. No. 6,489,949 to Yin, U.S. Pat. No. 6,515,852 to Huang et al. and U.S. Pat. No. 6,558,057 to Lin. However, the keyboard devices and covers disclosed in the known patents do not show portable keyboards with reduced size enclosures and standard desktop keyboard size keys and fail to disclose the use of portable keyboards with a portable information terminal.

The present invention overcomes many of the known problems with existing keyboards for portable information terminals by providing a separate portable keyboard with mostly standard desktop keyboard size keys having a reduced-size enclosure for the keys with a removable cover that is readily connected to a portable information terminal, and which is less prone to error in inputting data.

SUMMARY OF THE INVENTION

Accordingly, it is a general object of the present invention to provide an improved keyboard. It is a particular object of the present invention to provide an improved portable keyboard. It is still another particular object of the present invention to provide an improved portable keyboard having a reduced-size enclosure for use with a portable information terminal. It is a further particular object of the present invention to provide an improved portable keyboard having a reduced-size enclosure with a removable cover to protect the keyboard during transit. It is a still further particular object of the present invention to provide an improved portable keyboard having a mostly standard desktop keyboard size keys held in a reduced-size enclosure with a removable cover to protect the keys during transit. It is yet another particular object of the present invention to provide an improved portable keyboard having a removable cover to protect the keyboard during transit and which cover cooperates with a reduced-size enclosure to hold a USB connector and cable therein during transit. And, it is still another particular object of the present invention to provide an improved portable keyboard having a reduced-size enclosure with a slidably removable cover, which cover when removed, can be used to support the keyboard in a number of positions.

These and other objects and advantages of the present invention are achieved by providing a portable keyboard comprising a reduced-size enclosure for holding mostly standard desktop keyboard size keys and a removable cover that both protects the keyboard during transit and can be used to support the keyboard in selected positions to aid in its use. The keyboard is configured, sized and dimensioned so as to minimize errors when inputting data and to allow for storage in a portable computer carrying case.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, wherein:

FIG. 7 is an exploded side elevational view of a reduced-size enclosure for a keyboard over the removed cover; and FIG. 8 is a bottom plan view of the improved keyboard, looking in the direction of line 8—8.

DESCRIPTION OF THE PREFERRED EMBODIMENTS

Figure 1:
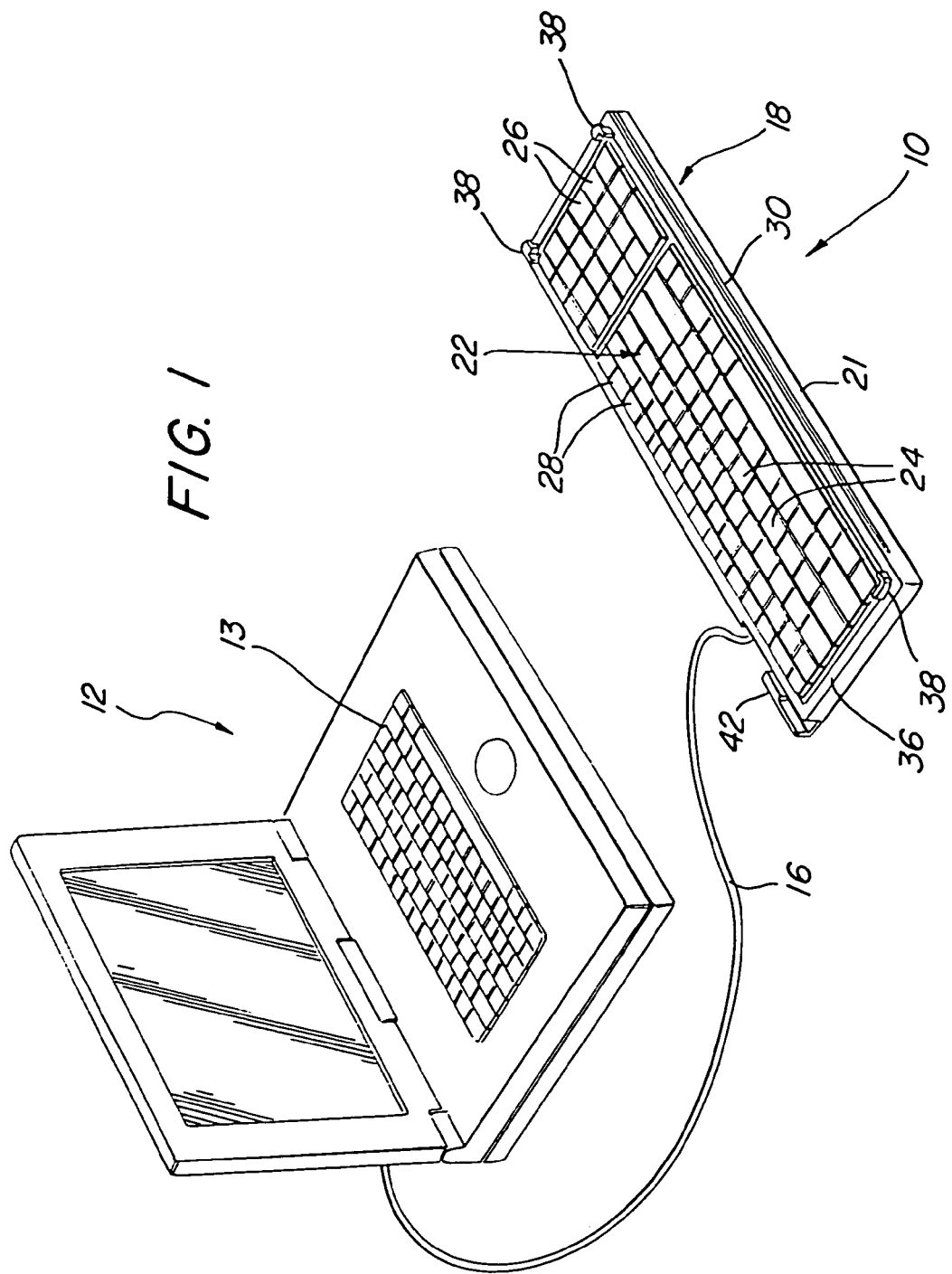
FIG. 1 is a perspective view of an improved keyboard of the present invention, with its cover removed and connected by a cable to a laptop or notebook computer.
Figure 2:
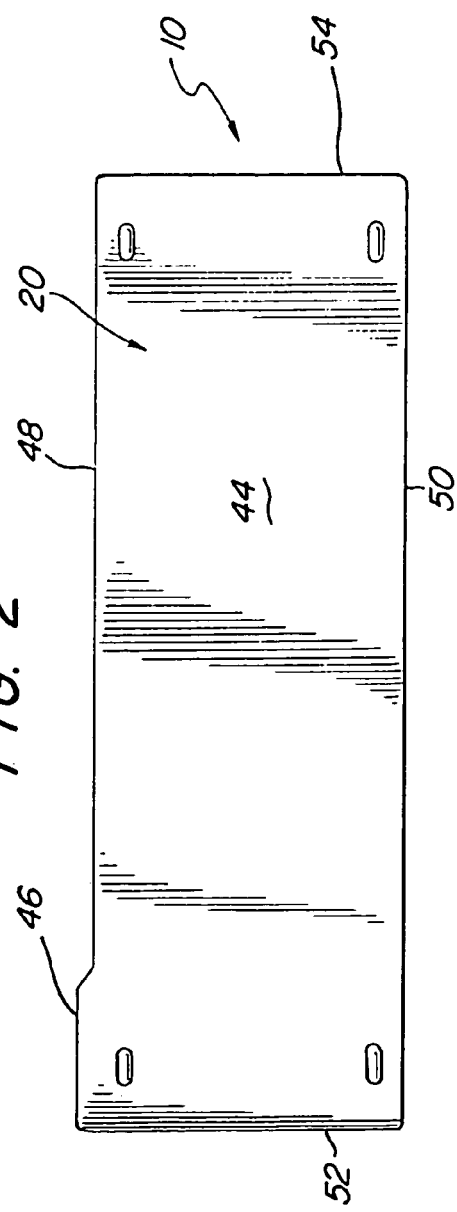
FIG. 2 is a top plan view of an improved keyboard of the present invention having the cover thereon in a closed position thereon.

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide for an improved portable keyboard for use with a portable information terminal.

The improved keyboard of the present invention may be used with any type of portable information terminal having, or which is to be used with a keyboard to enter data. The keyboard of the present invention utilizes currently available technology to provide an improved keyboard that may be remotely or directly connected to a portable information terminal to enable a user to more effectively and efficiently operate the portable information terminal. For reasons of explanation only a keyboard 10 is described and shown as being used with a laptop computer 12 having a built-in keyboard, and connected to this laptop computer by a USB connector 14 (FIG. 3) and a cable 16. It is to be understood that if the cable 16 is used, it may be connected at any convenient location on the keyboard 10, such as at the right or left end, depending on the desires and needs of the manufacturer and/or user.

A first embodiment of the keyboard 10 is shown in the drawings and comprises a first reduced size portion or key carrying base or enclosure 18 and a second portion or removable cover 20. The reduced size key carrying enclosure 18 includes a reduced size housing 21 with a plurality of normal or standard desktop keyboard size keys, such as those found on a common or standard keyboard for a personal computer, as known to one of ordinary skill in the art, operatively held therein. Furthermore, these normal or standard desktop keyboard size keys 22 have a standard pyramid-shaped keycap. However, to reduce the size of the keyboard 10, the enclosure or housing 21 is made with narrower side edges and ends and is only provided with three of the four sets of keys 22 typically found on a normal or standard desktop keyboard. That is, the keys 22, only include typing keys 24 in any desired type of layout, such as QWERTY, a numeric keypad 26 and function keys 28. Control keys normally found between the typing keys 24 and the numeric keypad 26 are eliminated so as to reduce the overall length of the housing 21 and, therefore, the keyboard 10, to enable it to be more easily transported and to fit into a laptop computer carrying case. That is, the elements of the keyboard 10 are configured, sized and dimensioned to be easily operated when connected to any computer, such as a laptop or notebook computer 12, as well as to be easily transported and stored in a laptop or portable computer carrying case.

As best shown in FIGS. 1 and 4–7 the housing 21 of base 18 includes cover cooperating portions, such as openings or slots 30 formed along two narrow elongated front and rear edges or walls 32, two narrow sides, a substantially flat bottom surface 34 and a narrow peripheral top edge 36 surrounding the keys 22. Raised portions or sections 38 are included on at least three corners. One or more of the raised portions or sections 38 may include extending or perpendicular arms 40 (see FIG. 7) to allow the cable 16, if used, to be wrapped around the sections 38 and held in place between the housing and the cover 20, when transporting the keyboard 10. Furthermore, as best shown in FIG. 3, the base 18 may include a specifically shaped holding portion 42 formed in or secured to the housing 21, for capturing and holding the USB connector 14 when the cable 16 is wrapped around the sections 38.

Figure 3:
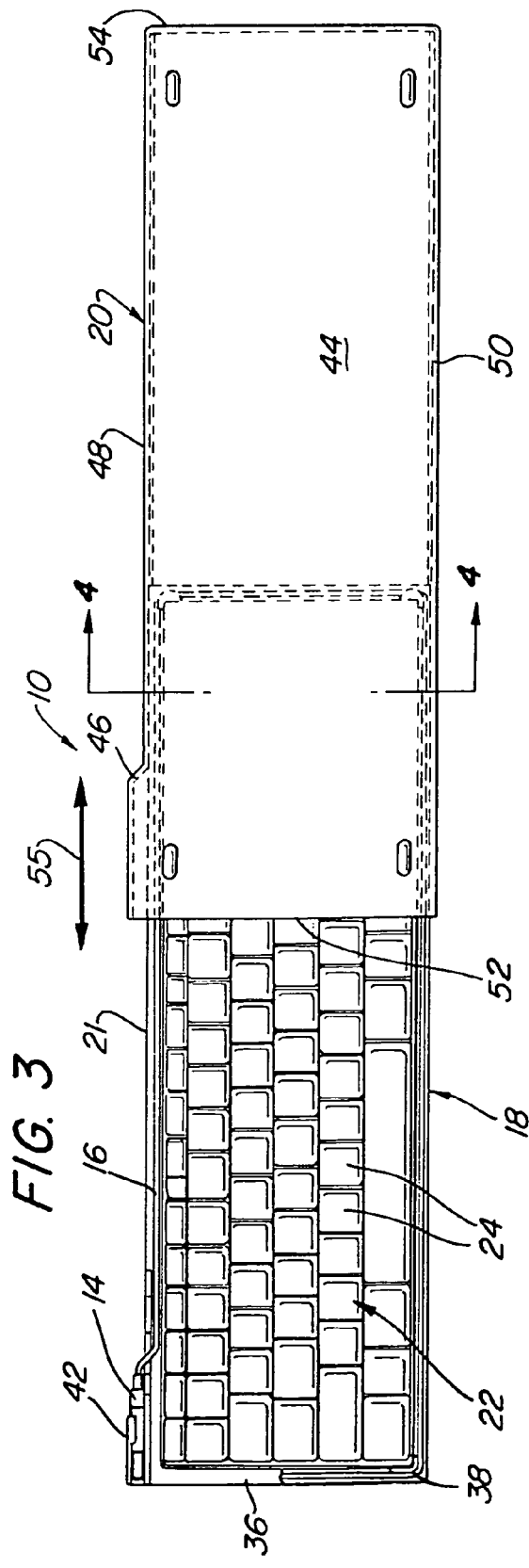
FIG. 3 is a top plan view of the keyboard of FIG. 2 showing the cover partially removed.
Figure 4:
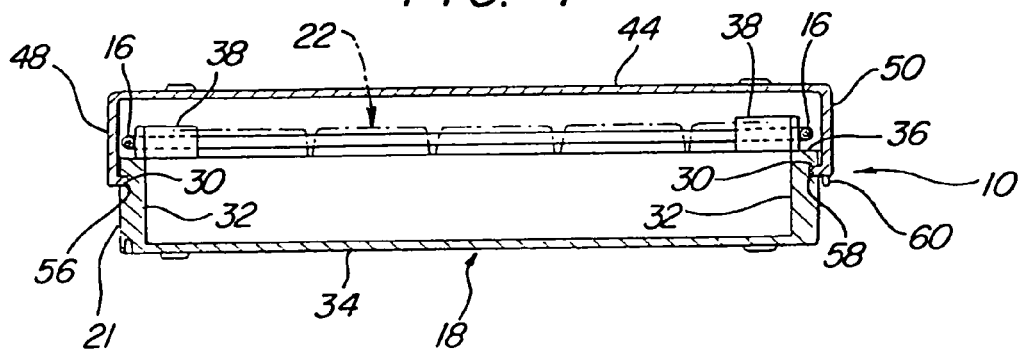
FIG. 4 is a cross-sectional view taken along line 4—4 of FIG. 3.

Turning now to FIGS. 2–7, the cover 20 comprises a substantially flat top 44 and preferably includes an extending portion 46 on one side to cover and cooperate with the holding portion 42 and to aid in holding or capturing the USB connector therebetween, when the cover is completely slid on the housing 21. The cover 20 preferably has an open U-shaped configuration with elongated sides 48, 50, an open end 52 (see FIG. 3) and a closed end 54 connected between the sides. As shown in FIG. 3, the cover 20 is slidable onto and off the base 18 in the direction of the arrow 55. The lower edges, ends or portions 56, 58 of the sides 48, 50 include lower cooperating portions, such as bent-over portions, flanges, or inwardly projecting areas or portions that extend toward each other at approximately 90° to the sides 48, 50 and substantially along the length of these sides (as shown in FIG. 3). The flanges 56, 58 are inserted into the open ends of the slots 30 to cooperate with or fit into and be easily movable into or slidable along the slots for movement of the cover onto and off the housing 21. The closed end 54 of the cover 20 and the closed ends of the slots 30 (see FIGS. 1 and 7) limit the movement of the cover onto the base 18 (see FIG. 2).

As shown in FIG. 7, the slots 30 may include one or more outwardly extending projections 31 for cooperation with reduced area portions in the flanges 56, 58 to firmly hold the cover 20 in the closed position on the housing 21 over the keys 22, but to allow the cover to be easily slid off of the housing when sufficient force is applied.

Figure 5:
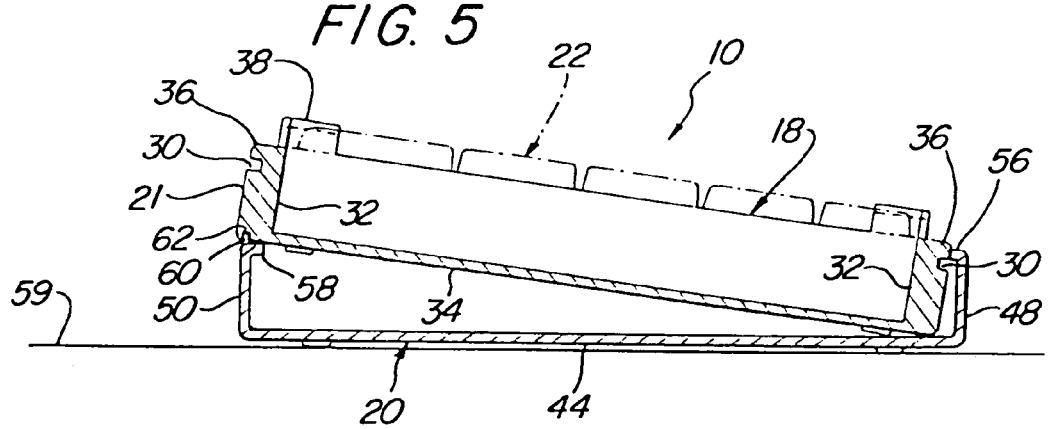
FIG. 5 is a cross-sectional view of the improved keyboard supported in an operating position at an angle in the removed cover.
Figure 6:
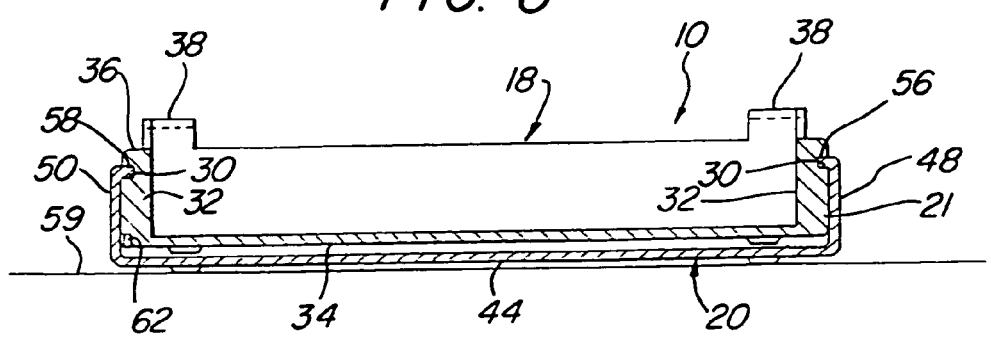
FIG. 6 is a further cross-sectional view of the improved keyboard slid into and supported in a flat operating position in the cover.

When the cover 20 is removed from the enclosure 21 and its top 44 placed or laid on a flat surface 59, the base 18 may be selectively slid into the cover with the bottom 34 facing toward an inner surface of the top 44 (see FIG. 6) where it is held in a substantially flat position for use. Alternately, as shown in FIG. 5, the base 18 may be supported in an operating position at an angle in the removed cover 20 by means of raised ears 60 formed along side 50 cooperating with flattened or open portions 62 formed in bottom 34 adjacent one of the side walls 32.

It, therefore, can be seen that an easily used portable keyboard comprising a reduced-size enclosure containing a selected number of standard size keys has been designed. The portable keyboard is provided with a cover that protects the keyboard during storage and transit and which can be slid off and used to support the keyboard in selected positions to aid in its use. The portable keyboard may be remotely of directly connected to a portable information terminal and is configured, sized and dimensioned to be easily operated with a minimum number of errors and stored in a portable information terminal carrying case when not in use.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. A portable keyboard, comprising;
   a base having a reduced-size housing with a standard-size key arrangement held in the reduced-size housing;
   a cover removably held on the reduced-size housing over the standard-size key arrangement;
   the reduced-size housing including elongated, narrow front and rear side walls cooperating with flanges formed on the cover to allow the cover to be removed from and put on the reduced-size housing;
   slots formed along the elongated, narrow front and rear portions of the reduced-size housing for cooperation with the flanges formed at lower ends of side edges of the cover;
   the cover adapted to support the reduced-size housing in selected positions when removed from the reduced-size housing over the standard-size key arrangement; and
   raised ears formed along one side of the cover which cooperate with flattened portions formed in a bottom of the reduced-size housing to support the reduced-size housing and the standard-size key arrangement in an angled position when the cover is removed from the reduced-size housing over the standard-size key arrangement and inserted under the bottom of the reduced-size housing.

2. The portable keyboard of claim 1 wherein the cover has an open U-shaped configuration to enable it to be slid onto and off the reduced-size housing over the standard-size key arrangement by cooperation of the flanges with the slots.

3. The portable keyboard of claim 2 wherein the standard-size key arrangement only includes typing keys, a numeric keypad and function keys.

4. The portable keyboard of claim 2 wherein the cover comprises a substantially flat top with an extending portion on one side to cover and cooperate with a holding portion on the reduced-size housing to firmly capture a USB connector therebetween when the cover is in a closed position on the reduced-size housing over the standard-size key arrangement.

5. A portable keyboard, comprising:
   a base having a reduced-size housing with a standard-size key arrangement held in the reduced-size housing surrounded by substantially narrow side edges and ends;
   a cover slidably held on the reduced-size housing over the standard-size key arrangement; the cover comprising flanges formed at and extending along lower ends of side edges and toward each other at approximately 90°;
   the substantially narrow side edges including elongated front and rear side walls having slots formed therein; the slots having open front portions and closed end portions; and
   the cover having an open U-shaped configuration to enable the flanges to be inserted into the open front portions of the slots so as to be slid onto and off the reduced-size housing over the standard-size key arrangement.

6. The portable keyboard of claim 5, further including raised ears formed along one side of the cover which cooperate with a bottom of the reduced-size housing to support the reduced-size housing and the standard-size key arrangement in an angled position when the cover is removed from the reduced-size housing over the standard-size key arrangement and inserted under the bottom of the reduced-size housing.

7. The portable keyboard of claim 5 wherein the cover comprises a substantially flat top with an extending portion on one side to cover and cooperate with a holding portion on the reduced-size housing to firmly capture a USB connector therebetween when the cover is slid into a closed position on the reduced-size housing over the standard-size key arrangement.

8. The portable keyboard of claim 5 wherein the standard-size key arrangement only includes typing keys, a numeric keypad and function keys.

9. The portable keyboard of claim 5 wherein the cover is adapted to support the reduced-size housing in selected positions when removed from the reduced-size housing over the standard-size key arrangement and inserted under the bottom of the reduced-size housing.

10. The portable keyboard of claim 9 wherein the cover comprises a substantially flat top with an extending portion on one side to cover and cooperate with a holding portion on the reduced-size housing to firmly capture a USB connector therebetween when the cover is slid into a closed position on the reduced-size housing over the standard-size key arrangement.

11. The portable keyboard of claim 10, further including raised ears formed along one side of the cover which cooperate with a bottom of the reduced-size housing to support the reduced-size housing and the standard-size key arrangement in an angled position when the cover is removed from the reduced-size housing over the standard-size key arrangement and inserted under the bottom of the reduced-size housing.

12. A portable keyboard, comprising:

a base having a reduced-size housing with a standard-size key arrangement held in the reduced-size housing and surrounded by substantially narrow side edges and ends; the substantially narrow side edges having elongated slots with open ends formed therein;

a cover slidably held on the reduced-size housing over the standard-size key arrangement and having flanges formed at lower ends of side edges cooperating with the slots; the flanges extending along the lower ends and toward each other at approximately 90°;

the cover having a substantially flat top with an extending portion on one side to cover and cooperate with a holding portion formed on the reduced-size housing to firmly capture a USB connector therebetween when the cover is slid into a closed position on the reduced-size housing over the standard-size key arrangement; and the cover adapted to support the reduced-size housing in selected positions when removed from the reduced-size housing over the standard-size key arrangement and inserted under the bottom of the reduced-size housing, by means of raised ears formed along one side of the cover.

* * * * *